United States Patent [19]

Masuda et al.

[11] 3,801,162

[45] Apr. 2, 1974

[54] FLUID PRESSURE REGULATOR VALVE AND SAFETY VALVE ASSEMBLY

[75] Inventors: Naosuke Masuda, Higashi-Matsuyama; Toshihiro Abe, Kawagoe, both of Japan

[73] Assignee: Jidosha Kiki Kabushiki Kaisha, Tokyo, Japan

[22] Filed: Apr. 6, 1973

[21] Appl. No.: 348,821

[30] Foreign Application Priority Data
June 1, 1972   Japan............................... 47-54463

[52] U.S. Cl.................................. 303/84 A, 303/10
[51] Int. Cl.............................................. B60t 15/46
[58] Field of Search............... 303/10, 13, 2, 7, 6 C, 303/84 A, 84 R, 40, 52; 188/152, 151 A

[56]   References Cited
UNITED STATES PATENTS

| | | | |
|---|---|---|---|
| 3,526,440 | 9/1970 | Blair | 303/2 |
| 3,677,607 | 7/1972 | Schultz et al. | 303/10 |
| 3,727,986 | 4/1973 | Koivunen | 303/10 |

*Primary Examiner*—Duane A. Reger
*Assistant Examiner*—D. C. Butler
*Attorney, Agent, or Firm*—Sughrue, Rothwell, Mion, Zinn & Macpeak

[57]   ABSTRACT

A fluid pressure regulator valve assembly for pressure accumulators used in a dual full pressure hydraulic brake system for vehicles. The regulator valve assembly is connected between an engine driven hydraulic pump and the accumulators to regulate the maximum pressure stored in the accumulators. The regulator valve assembly also includes an emergency shut-off valve and a one-way check valve for each separate hydraulic braking circuit and is responsive to a pressure differential between the two accumulators caused by a pressure drop due to a rupture in one of the braking circuits to actuate the shut-off valve in the ruptured circuit for preventing loss of hydraulic fluid from the braking system. The shut-off valves and one-way check valves allow the remaining operational brake circuit to operate at full capacity without interruption.

7 Claims, 2 Drawing Figures

FLUID PRESSURE REGULATOR VALVE AND SAFETY VALVE ASSEMBLY

BACKGROUND OF THE INVENTION

1. Field of the Invention

This invention relates generally to a fluid pressure regulator valve assembly, and more particularly, to a regulator valve assembly for pressure accumulators used in a dual full power hydraulic brake system for vehicles.

2. Description of the Prior Art

In full power hydraulic brake systems, hydraulic pressure supplied from an engine driven pump is generally accumulated in a pressure accumulator so that any application of a brake pedal connected to a brake control valve will cause introduction of pressurized fluid to the wheel cylinders for stopping rotation of the wheels. Accordingly, it is necessary that an amount of fluid pressure sufficient to provide the desired braking action but insufficient to cause impairment of durability of the brake system be accumulated and retained within the accumulators at all times.

In the prior art hydraulic brake systems having a single braking fluid conduit, however, a mechanical failure at any point necessarily caused escape of the braking fluid, thus resulting in complete loss of control of the brake system.

SUMMARY OF THE INVENTION

The present invention is directed toward the provision of an improved pressure regulator valve assembly for use in a dual full power hydraulic brake system which is highly reliable and safe in operation by providing two independent braking fluid conduits branching from a common supply passage connected to a source of pressurized fluid, so that a loss of pressure due to a mechanical failure in either brake conduit will not prevent the total brake system from maintaining its normal operating condition.

In accordance with one aspect of the present invention, there is provided a fluid pressure regulator valve assembly which comprises two independent brake fluid conduits branching from a common supply passage leading from a source of pressurized fluid. Each of the fluid conduits is connected through an emergency valve to a separate accumulator incorporating a check valve, and a slide valve common to both of the independent conduits and operable to urge the emergency valves to their open position during normal operating condition, wherein fluid pressure from each of the accumulators is normally applied to a respective one of the opposite sides of the slide valve to retain the corresponding emergency valve in its open position. A loss of pressure within either of the accumulators will cause movement of the slide valve in such direction as to close the emergency valve connected to the accumulator which has lost pressure. A normal brake operating condition will thus be maintained, should either of the brake conduits be damaged or destroyed, since the slide valve will shut off the damaged conduit from the supply source to prevent fluid leakage in response to a pressure differential between the damaged brake conduit and the normally operating brake conduit so that the latter will continue to operate normally, assuring the normal braking capability of the total brake system. Furthermore, any seizing problems of the pressure pump due to leaks of the braking fluid are substantially eliminated.

Another feature of the present invention is to provide a fluid pressure regulator valve assembly which has the above-mentioned connections and further includes a return passage provided in communication with the common supply passage at a point upstream of the dividing point of the two branching conduits, with the return passage containing a stop valve, including a releasing element adapted to release and open the stop valve in response to a predetermined amount of pressure in either of the accumulators. The releasing element includes a piston assembly located on and abutting against the other side thereof for retaining the releasing element in the neutral position by the action of counteracting and balancing pressure from the two accumulators; thus, when the fluid pressure of each accumulator has reached a predetermined value sufficient to provide the desired braking effect, the releasing element will open the stop valve to permit a recirculation of pressurized fluid through the return passage, thereby terminating pressure supply to the accumulators and placing the pump in a no-load condition.

A loss of pressure in either accumulator resulting from application of the brake will cause the stop valve to move to its closing position, permitting introduction of fresh pressurized fluid through the check valve to the corresponding accumulator so as to recover the desired accumulator pressure. As a result, a mechanical fault in one brake line will not prevent the normal operating condition of the total braking system from being maintained because the other brake conduit will still remain in good operating condition.

DESCRIPTION OF THE PREFERRED EMBODIMENT

Figure 1:
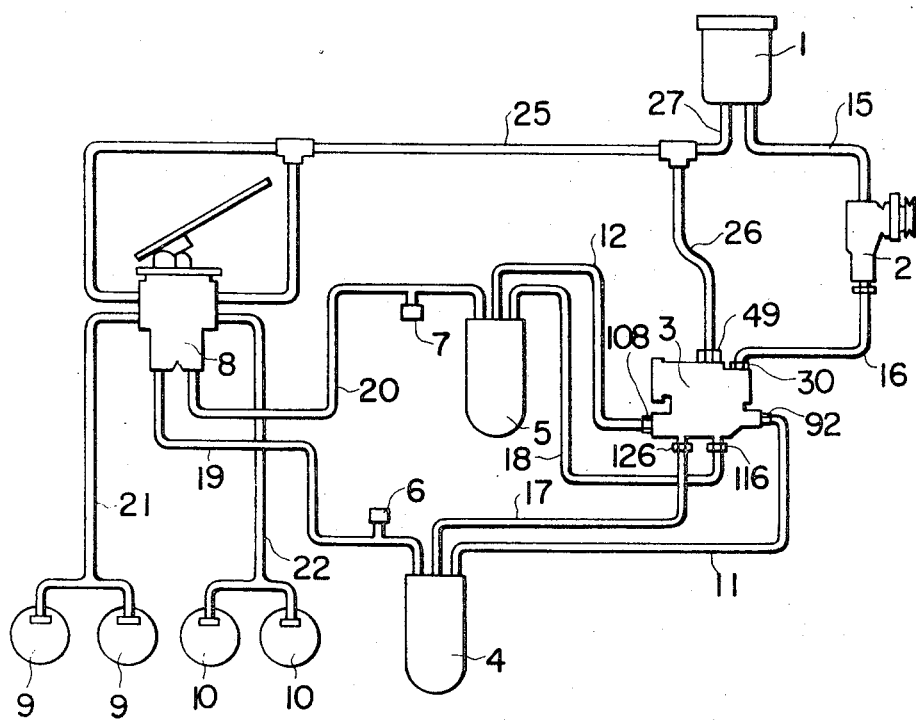
FIG. 1 is a diagrammatic fluid circuit of a dual full power hydraulic brake system incorporating a preferred embodiment of the pressure regulator valve assembly in accordance with the invention.

Referring to the drawings, particularly to FIG. 1, a fluid reservoir 1 is provided for supplying hydraulic fluid through a low pressure flexible hose 15 to an engine driven pump 2, which may be of the piston type or any other suitable high pressure pump construction. The output from the pump 2 is conducted through a high pressure conduit 16 to a pressure regulator valve assembly 3. From the pressure regulator valve assembly 3 the high pressure fluid is distributed to two independent accumulators 4 and 5 through conduits 17 and 18 connected to the branching outlets 126 and 116, respectively.

A portion of the hydraulic fluid accumulated within the accumulators 4 and 5 is circulated back to the pressure regulator valve assembly 3 through return pipes 11 and 12 and inlet ports 92 and 108 in the pressure regulator valve assembly 3 for sensing the accumulator pressure. When the accumulator pressure has reached a predetermined maximum value, a pressure releasing assembly provided in the valve assembly 3 will be operated to allow recirculation of hydraulic fluid from the conduit 16 through conduits 26 and 27 connected to discharge port 49 and back to the reservoir 1.

Pressure outlet conduits 19 and 20 are provided between accumulators 4 and 5 and a brake control valve 8 for supplying the hydraulic fluid from the respective accumulators 4 and 5 to the brake control valve 8. Upon application of a brake pedal on the brake control valve 8, the pressurized hydraulic fluid is supplied through conduits 21 and 22 to the front wheel brake cylinders 9 and the rear wheel brake cylinders 10, respectively, of a running vehicle. The brake control valve 8 is of a known construction and, accordingly, no further description of the internal construction thereof is required.

A return conduit 25 is connected between discharge port of the control valve 8 and a conduit 27 which, in turn, is connected to the reservoir 1 for recovery of the used hydraulic fluid. A further return conduit 26 communicates a return port on pressure regulator valve assembly 3 with the reservoir 1 through conduit 27.

Pressure sensitive switches 6 and 7 are located in the pressure outlet conduits 19 and 20 of the accumulators 4 and 5, respectively, and are operable to energize an alarm device in response to a drop in pressure within either of the accumulators 4 and 5 below a predetermined value due to a mechanical fault or other adverse conditions.

Figure 2:
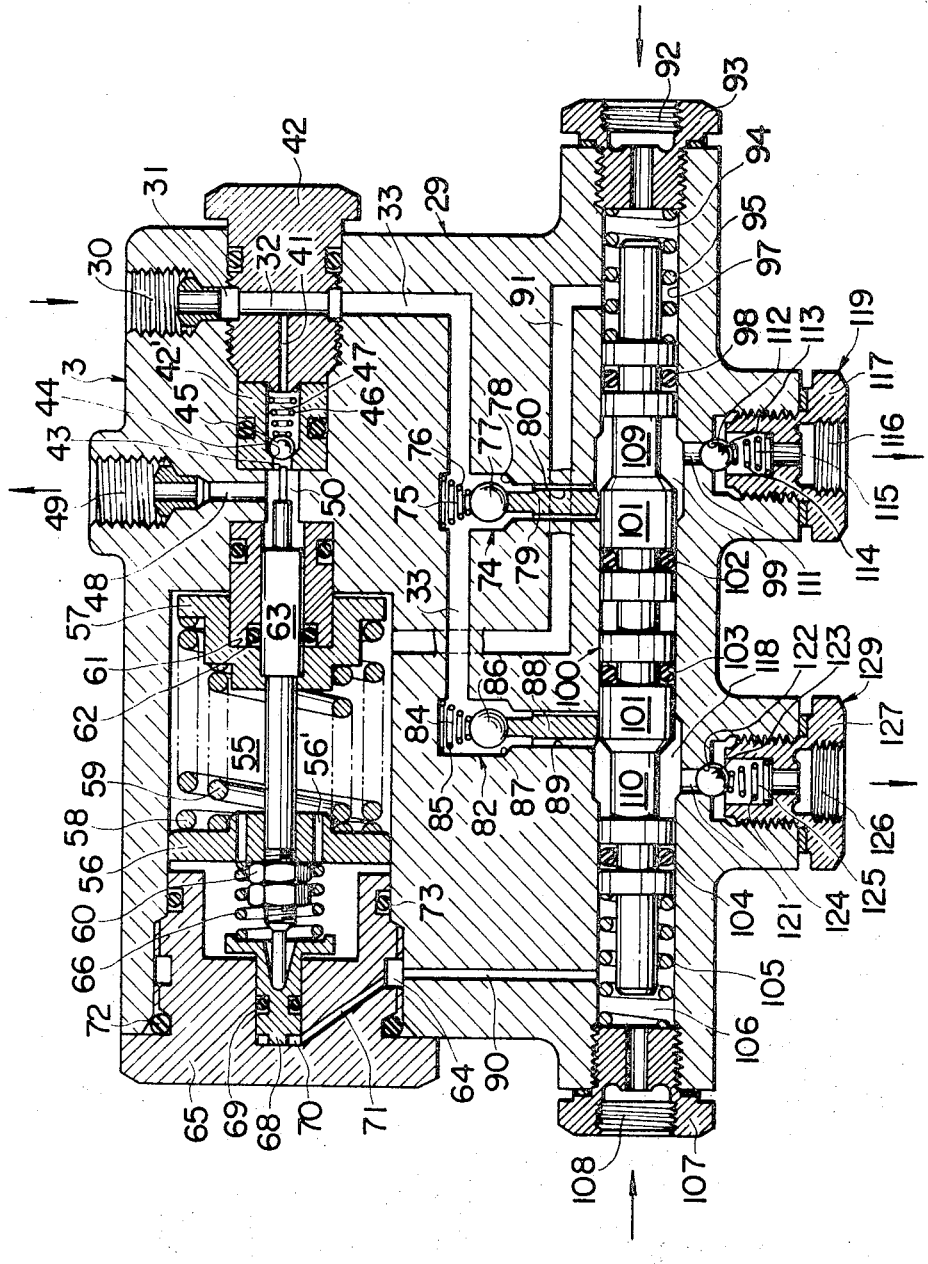
FIG. 2 is a longitudinal cross section, on an enlarged scale, of the pressure regulator valve assembly.

Referring now to FIG. 2 which shows a detail construction of the pressure regulator valve assembly 3 the valve assembly 3 includes a valve housing 29 having an inlet port 30 located in the top of the housing and connected to the conduit 16 leading from the pressure pump 2. The inlet port 30 communicates with an annular groove 31 encircling a shut-off plug 42 which is threaded into the valve housing from one side thereof. The detailed description of the plug will be given hereinafter in the specification. The annular groove 31, in turn is connected through a transverse opening 32 in the plug 42 to a passage 33 extending radially inwardly in the housing 29.

Emergency valves 74 and 82 are located at an intermediate point and at the terminus of the passage 33, respectively. Each valve 74 and 82 includes a valve element 77 and 86 positioned in a valve chamber 75 and 84, respectively, and urged against a valve seat 78 and 87 by a spring 76 and 85. The valve seats 78 and 87 are provided around apertures communicating with branch passages 80 and 89, respectively, Each of the branching passages have a sliding rod 79 and 88 positioned therein. A longitudinal cut-out or slot is formed along the longitudinal length of each sliding rod 79 and 88.

A slide valve 100 is provided in a bore 97, formed through the lower portion of the valve housing 29 perpendicular to passages 80 and 89 for urging each of the emergency valves 74 and 82 to its open position during normal operating conditions. The slide valve 100 includes large diameter central portions 101 and small diameter end portions 109 and 110.

The opposite sides of the central portions 101 of the slide valve 100 are normally maintained in contact with the lower ends of the sliding rods 79 and 88 so that each of the valve elements 77 and 86 is retained in its open position away from the corresponding valve seat 78 and 87 against the action of springs 76 and 85. In this embodiment, the small diameter end portions 109 and 110 of the slide valve 100 are located such that valve chambers 99 and 118, which are defined between end portions 109 and 110 and the bore 97 are in communication with the valve chambers 75 and 84 of the emergency valves 74 and 82 through the cut-outs or slots in the sliding rods 79 and 88. Seals 98, 102, 103, and 104 are provided on each side of the chambers 99 and 118 to prevent leakage of fluid therefrom.

Plugs 93 and 107 are threaded into the opposite ends of the bore 97. Inlet ports 92 and 108 in the plugs 93 and 107 are connected to the return conduits 11 and 12 of the hydraulic accumulators 4 and 5, respectively. Inlet chambers 94 and 106 are defined between the plugs 93, 107 and slide valve 100. The inlet chambers 94 and 106 contain springs 95 and 105 extending between the inner ends of the plugs 93 and 107 and the opposite ends of the slide valve 100 for locating and holding the slide valve 100 in the neutral position, as shown in FIG. 2.

Check valve assemblies 119 and 129 are located in the valve housing 29 at the ends of passages 111 and 121. The passages 111 and 121 communicate with the valve chambers 99 and 118 in the bore 97, The check valves 119 and 129 include plugs 117 and 127, which are threaded into valve chambers 115 and 125 in communication with the passages 111 and 121. Valve elements 113 and 123 are movably retained in chambers 115 and 125, respectively, by plugs 117 and 127, and are biassed by springs 114 and 124 against valve seats 112 and 122 formed at the lower ends of the passages 111 and 121.

Outlet ports 116 and 126 are formed in the plugs 117 and 127 and are connected to the respective accumulators 5 and 4 through the conduits 17 and 18. In the illustrated embodiment of the present invention shown in FIG. 2, pressurized fluid delivered from the pump 2 to the inlet port 30 of the valve assembly 3 will pass through the passage 33, the emergency valves 74 and 82, the branching passages 80 and 89, and the valve chambers 99 and 118, open the check valves 113 and 123, and will be accumulated in the accumulators 5 and 4, respectively.

The pressure regulation and recirculation circuit which may be completed and established when pressure accumulation both in the accumulators 4 and 5 has reached a maximum value will now be described with reference to FIG. 2. An orifice 41 is formed axially in plug 42 and is connected with the opening 32 extending through the plug 42. The orifice 41 opens into a valve chamber 47 defined within a cylindrical member 42' fixedly secured to the inner end of the plug 42. Located in and opening through member 42' at the other end of the valve chamber 47 is an outlet port 43 for permitting a return flow of the pressurized fluid to the reservoir 1. The outlet port 43 contains a valve element 45 normally urged against a valve seat 44 formed on the inner wall of the port 43 by the action of a spring 46.

The outlet port 43 is connected to an internal passage 50 which, in turn, is connected by a longitudinal passage 48 through a discharge port 49 to the return conduits 26 and 27 leading to the reservoir 1 to form a recirculation circuit for excess fluid in conjunction with the orifice 41. the valve chamber 47, and the outlet port 43.

A large diameter cylinder bore 55 is formed as an axial extension of the internal passage 50. A plug 65 is fitted into an open end of the cylindrical bore 55 on the left side thereof in FIG. 2 by the interposition of seals 72 and 73 for sealing bore 55. The plug 65 provides a seal for the cylinder bore 55, which, in turn, communicates with the right side inlet chamber 94 of the slide valve assembly through a passage 91, the inlet port 92, and the return passage 11 leading to one accumulator 4.

Sealingly fitted to the inner end of the cylindrical bore 55 is an outer shell 61 which contains a releasing element 63 slidably fitted in an interior bore of the outer shell 61. The releasing element 63 has an inner end portion extending through the internal passage 50 and the outlet port 43 and abutting the valve element 45. An inner spring seat 57 is positioned over the releasing element 63 and tightly fitted onto the projection of the shell 61 for locating and suspending springs 58 and 59. An outer spring seat 56 is fixedly mounted on the outer end portion of the releasing element 63 which extends into bore 55. The outer spring seat 56 is provided with at least one axial passage 56' extending therethrough.

An adjusting nut 60 is threaded onto the outer end portion of element 63 to provide a well-controlled restraining force tending to urge and keep the inner end of the releasing element 63 away from the valve element 45.

When the pressure within the one accumulator 4 has reached a predetermined maximum value, the internal pressure within a chamber 67 formed within the cylindrical bore 55 on the left side of outer spring seat 56 and which communicates with the return passage 11 through the passage 91 and axial passage 56' in spring seat 56 overcomes the opposing combined forces of springs 58 and 59, thus causing the releasing element 63 to move toward the right, thereby moving the valve element 45 away from the valve seat 44 to complete the above-mentioned recirculation circuit between inlet port 30 and discharge port 49.

A small diameter cylindrical bore 70 is provided at the inner end of the plug 65 and is located coaxially around an axial extension of the releasing element 63. Slidably fitted and located in the small diameter cylindrical bore 70 by the interposition of a seal 69 is a piston 68, which includes an inner end urged against the axial extension end of the releasing element 63. The effective diameter of the piston 68 is the same as that of the releasing element 63.

A spring 66 is located between the piston 68 and the outer spring seat 56 to prevent undesired axial motion of the piston 68.

The plug 65 further includes an annular groove 64 formed on the outer surface thereof and in communication with the outer end of the small diameter cylindrical bore 70 through a plug passage 71. The groove 64 also communicates with the inlet chamber 106 at the left end of the slide valve assembly through a downwardly extending passage 90. The outer end of the small diameter cylindrical bore 70 is connected through the inlet port 108 of the inlet chamber 106 and through the return passage 12 to the other accumulator 5 so that when the pressure of the accumulator 5 has reached a predetermined maximum value, the piston 68 within the cylindrical bore 70 forces the releasing element 63 toward the right against the action of the springs 58 and 59, thereby causing the valve element 45 to open to form a recirculation circuit similar to that described in conjunction with the accumulator 4.

Thus, it may be seen that the releasing element 63 is operated by the internal pressure of either of the accumulators 4 or 5 independently of each other.

Operation of a dual full power brake pressure control system utilizing the pressure regulator valve assembly of the present invention will now be described. When the operation of the brake system is initiated no pressure is accumulated in either of the accumulators 4 or 5. According no pressure is supplied from the accumulators 4 and 5 to the inlet chambers 94 and 106 of the slide valve assembly. Accordingly, the slide valve 100 is maintained in its neutral balanced position by the action of the springs 95 and 105, as shown in FIG. 2.

In the position shown in FIG. 2, the emergency valves 74 and 82 are held in their open positions by the sliding rods 79 and 88 resting on the opposite ends of the large diameter portion 101 of the slide valve 100. The releasing element 63 is retained in a spaced position away from the valve element 45 by the action of the springs 58 and 59, because no pressure is applied to either of the large or small diameter cylindrical bores 55 and 70 connected to the inlet chambers 94 and 106, respectively.

The valve element 45 is retained against the valve seat 44 so as to block the return passage leading to the discharge port 49 through the orifice 41 so that pressurized fluid delivered from the pressure pump 2 connected through the conduit 15 to the reservoir 1 passes through the conduit 16 and through the inlet port 30, the opening 32 and the passage 33 of the regulator valve assembly 3. The pressurized fluid proceeds through the cut-out passages of the sliding rods 79 and 88, the valve chambers 99 and 118, the passages 111 and 121, thereby forcing the check valve elements 113 and 123 to their open positions, and through the outlet ports 116 and 126, passages 18 and 17 to the accumulators 5 and 4, respectively.

The pressure accumulated in a respective one of the accumulators 4 and 5 is comunicated to the inlet chambers 94 and 106 and then to the large and small diameter cylindrical bores 55 and 70. During normal operation of the hydraulic brake system, the pressure of the accumulators 4 and 5 will be equal and balanced and the slide valve 100 will continue to be maintained in its neutral position due to the equal pressures realized in the inlet chambers 94 and 106 and applied to each end of slide valve 100.

Since the internal pressures of the large and small diameter cylindrical bores 55 and 70 are also equal, the piston 68 is maintained in its neutral position, wherein the releasing element 63 is urged toward the right in FIG. 2, creating a tendency for the valve element 45 to readily separate and release from the seat 44.

Upon continued operation of the pump 2, when the internal pressure of the large diameter cylindrical bore 55 in chamber 67 has reached the predetermined maximum value, the releasing element 63 will move to the right and against the force of the springs 58 and 59 and force the valve element 45 away from the valve seat 44, whereupon a recirculation circuit will now be established which will allow pressurized fluid delivered from the pump 2 to pass through the inlet port 30, the annular groove 31, the opening 32 and orifice 41 through the valve chamber 47, and return through the outlet port 43, the internal passage 50, the longitudinal passage 48, the discharge port 49 and the return conduits 26 and 27, back to the reservoir 1 and thence to pump 2.

This recirculation operation results in a no-load condition on the pump 2.

During such no-load operation, the internal pressure of the passage 33, the emergency valves 74 and 82 and the valve chambers 99 and 118 all will be essentially zero. However, the pressures within the accumulators 4 and 5 will remain at the previously attained maximum value due to the pressure of the check valve assemblies 119 and 129.

When the pedal of the brake control valve 8 is depressed, some of the pressurized fluid within the accumulators 4 and 5 is released and is supplied through the conduits 21 and 22 to the respective front and rear brake cylinders 9 and 10 to provide a braking force in proportion to the pressure applied to the pedal. Upon release of the pedal, pressurized fluid is returned from the front and rear brake cylinders 9 and 10 through the discharge port of the brake control valve 8 and through the conduits 25 and 27 to the reservoir 1.

In this manner, the braking action can be repeatedly applied, as desired, until the pressure within the accumulators 4 and 5, hence, the pressure within the large and small diameter cylindrical bores 55 and 70 has decreased to a lower predetermined value whereby the releasing element 63 is permitted to move toward the left by the action of the springs 58 and 59, causing the valve element 45 to return to its initial seating position. When the valve element 45 has been seated against valve seat 44, the recirculation circuit through the orifice 41 is shut off and the pressurized fluid supplied from the pump 2 to the inlet port 30 is supplied to the accumulators 4 and 5 in the manner previously described hereinabove with reference to FIG. 2.

Repeated operation, including shut-down and restarting of the pressure accumulating operation assures a properly functioning brake control capability which will proceed without interruption during the engine operating process.

It should be noted that the hydraulic pressure acting against the releasing element 63 to cause a seating or release of the valve element 45 against the valve seat 44 is due to the internal pressure of either one of the large and small diameter cylindrical bores 55 and 70, that is, from either of the accumulators 4 or 5 which has attained the predetermined pressure valve earlier than the other.

If a mechanical failure should occur at any point in the front wheel brake system including the accumulator 4 and the brake cylinder 9, or interconnecting conduits 11, 17, 19 or 21, an abrupt decrease of pressure within the accumulator 4 will cause an immediate and rapid pressure drop within the inlet chamber 94 and in chamber 67 within the large diameter cylindrical bore 55, thus resulting in destruction of the pressure balance on the slide valve 100, thereby causing rightward movement of the slide valve 100. This movement causes the sliding rod 88 to be moved away from the left side of the large diameter section 101 of the slide valve 100 and drop onto the small diameter section 110.

As a result, the valve element 86 on the top end of the sliding rod 88 is caused to seat against the valve seat 87, thus closing the emergency valve 82. Accordingly, no pressurized fluid is supplied from the pump 2 to the accumulator 4 and its associated conduits, thus avoiding leakage of any pressurized fluid through the broken part of the front wheel brake system.

On the other hand, the remaining accumulator 5 will continue to retain the predetermined pressure value notwithstanding the substantial pressure drop within the large diameter cyindrical bore 55. Accordingly, the valve element 45, which is controlled by the releasing element 63 actuated by the piston 68 subjected to the internal pressure of the small diameter cylinder bore 70, will still remain in good operating condition, without losing the braking capability of the rear brake system.

In a preferred embodiment, the slide valve 100 may be operably connected to an alarm device so that any movement of the slide valve 100 will energize the alarm circuit so as to generate an alarm signal to warn the operator of brake damage.

When a mechanical failure in the rear wheel brake conduit including the accumulator 5, the brake cylinder 10, and the interconnecting conduits 12, 18, 20 and 22, should cause a loss of pressure within the accumulator 5, the pressure of the inlet chamber 106 will accordingly be reduced, causing the slide valve 100 to move toward the left in FIG. 2.

The leftward movement of the slide valve 100 will result in closing of the emergency valve 74 in the same manner as emergency valve 82 thus interrupting the delivery of the pressurized fluid from the pump 2 to the accumulator 5 so as to avoid leakage through the damaged section of the rear wheel brake system.

Even through there is a corresponding pressure drop in the small diameter cylindrical bore 70, this pressure drop will not interfere with the normal valving action of the valve element 45 by the releasing element 63 because of the internal pressure in chamber 67 in the large diameter cylindrical bore 55 connected to the normally operating accumulator 4. Thus, it will be seen that if either of the two brake systems should become damaged and inoperable, the remaining system will still retain its braking capability. Furthermore, any seizing problem previously inherent with the pump 2 is substantially eliminated.

The magnitude of the pressure differential between the inlet chambers 94 and 106 required to cause a movement of the slide valve 100 in either direction may be determined by selecting the force of the springs 95 and 105 so as to provide the desired result.

As previously described, it may usually be preferred to provide pressure sensitive switches 6 and 7 adapted to be actuated to give an alarm to the operator in response to a pressure drop within either of the accumulators 4 and 5 below the lower predetermined value.

From the foregoing, it should be readily appreciated that the pressure regulating valve assembly of the present invention assures and maintains the braking capability of the total dual braking system notwithstanding a mechanical fault in either of the two conduits of the system and also substantially eliminates the occurrance of braking fluid leakage therefrom.

What is claimed is:

1. A fluid pressure regulator valve assembly for a dual full pressure hydraulic brake system having two independent brake fluid conduits branching from a commmon supply passage connected to a source of pressurized fluid, said valve assembly comprising a pressure regulated valve connected in said common supply passage each of said independent conduits being connected through an emergency valve to an accumulator, a check valve connected in each independent conduit and a slide valve common to both of said independent conduits and operatively connected to each of said emergency valves, said slide valve being operable to urge said emergency valves to their open position during normal operating condition, wherein fluid pressure from each of said accumulators is normally applied to a respective one of the opposite sides of said slide valve to retain the corresponding emergency valve in its open position, a loss of pressure within either of said accumulators causing movement of said slide valve in the direction to close the emergency valve connected to the accumulator having the loss in pressure.

2. A fluid pressure regulator valve assembly claimed in claim 1, further comprising a return passage in communication with said comoon supply passage at a point upstream of the dividing point of said two branching independent conduits, said return passage having a stop valve therein, said stop valve including a releasing element communicating with each of said accumulators and adapted to release and open said stop valve in response to a predetermined amount of pressure in either of said accumulators, said releasing element including a piston assembly located on and urged against the side thereof opposite said stop valve for retaining said releasing element in the neutral position by the action of counteracting and balancing pressure from said two accumulators.

3. A fluid pressure regulator valve assembly for a dual full pressure hydraulic brake system having a source of pressurized fluid communicating with a first and a second accumulator, said first and second accumulators being further communicated to a first and second vehicle wheel brake, respectively, through a brake pressure control valve said regulator valve assembly comprising, a valve body, an inlet port in said valve body connected to said source of pressurized fluid, a first and a second outlet port in said valve body communicating with said inlet port, said first and said second oulet ports communicating with said first and said second accumulators, respectively, an exhaust port communicating with said pressure inlet port, a pressure regulator valve connected between said inlet port and said exhaust port for regulating the inlet fluid pressure, a slide valve slidably mounted within said valve body and connected between said pressure inlet port and each of said pressure outlet ports, pressure sensing ports in said valve body communicating with each end of said slide valve, each of said pressure sensing ports communicating with one of said accumulators, respectively, for communicating the pressure of each accumulator to one end of said slide valve, respectively, said slide valve being maintained in a neutral position when the pressures in said accumulators are equal and slidable in the direction opposite the port to which the greater accumulator pressure is applied when the accumulator pressure differential exceeds a predetermined value, a first and a second emergency shut-off valve connected between each of said first and second pressure outlet ports, respectively, and said pressure inlet port, said first and second emergency shut-off valves being operatively connected to said slide valve and actuated thereby to block communication between the pressure inlet port and the pressure outlet port connected to the accumulator having the lower pressure when a pressure differential is present between said first and second accumulators, first and second passages formed in said valve body between said first and second pressure sensing ports, respectively, and said regulator valve, said regulator valve being responsive to the pressures in either of said first and second passages to regulate the hydraulic pressure supplied from said pressure supply source, whereby during normal operating conditions, fluid pressure from each of said accumulators is normally supplied to a respective one of each of the ends of said slide valve to maintain each of said first and second emergency shut-off valves in its open position, and, upon a loss of pressure within either of said accumulators, said slide valve will move in the direction of the lower pressure made to the corresponding pressure sensing ports to close the emergency valve connected with the accumulator having the lower pressure.

4. A fluid pressure regulator valve assembly as claimed in claim 3, further comprising a one-way check valve connected in each of said pressure outlet ports for allowing the flow of pressure fluid from said pressure outlet ports to each of said accumulators and blocking the reverse flow of pressurized fluid from each of said accumulators into said first and second outlet ports, respectively.

5. A fluid pressure regulator valve assembly as claimed in claim 3, wherein said regulator valve comprises a return passage in said valve body communicating with said pressure inlet port at a point upstream of said first and second emergency shut-off valves, said return passage having a check valve therein, said check valve being biassed to the closed position, and further including a releasing element slidably contained in said valve body, and a piston assembly slidably mounted in a cavity formed in said valve body, said piston assembly being operatively connected to said releasing element and communicating with each of said first and second accumulators, respectively, and actuated by the pressurized fluid contained therein to regulate the hydraulic pressure supplied to each of said accumulators by said pressure supply source.

6. A dual, full pressure hydraulic fluid brake system for vehicles comprising a source of pressurized fluid, a first and a second pressure accumulator connected to said source of pressurized fluid, a fluid pressure regulator assembly connected between said source of pressurized fluid and each of said first and second pressure accumulators, said fluid pressure regulator assembly including a fluid pressure regulator valve communicating with said source of pressurized fluid, a slide valve having each end thereof communicating with said first and said second pressure accumulators, respectively, a first and a second emergency shut-off valve connected between said source of pressurized fluid and said first and said second pressure accumulators, respectively, said first and second emergency shut-off valves being operatively connected to said slide valve and actuated thereby when said slide valve is moved in a first and a second direction, respectively, to block the flow of pressurized fluid from said source of pressurized fluid to said respective first and said second pressure accumulators, a first and second vehicle wheel brake communicating with said first and said second pressure accumulators, respectively, through a manually operated pressure control valve, whereby, upon the failure of one of said hydraulic systems due to a rupture, the pressure loss in said ruptured system will create a pressure differential across said slide valve to cause said slide valve to move in the direction of the lower pressure applied thereto to actuate the emergency shut-off valve connected in the ruptured hydraulic system to block the flow of pressurized fluid to said ruptured system.

7. A dual, full pressure hydraulic fluid brake system as claimed in claim 6, further comprising a first and a second one-way check valve connected between said slide valve and said first and said second pressure accumulator, respectively, said first and second one-way check valves allowing the passage of hydraulic pressurized fluid from said fluid pressure regulator assembly to each of said first and second pressure accumulators, and blocking the reverse flow of pressurized hydraulic fluid from said first and second pressure accumulators to said fluid pressure regulator assembly.

* * * * *